No. 774,826. PATENTED NOV. 15, 1904.
P. BUTLER.
APPARATUS FOR CLEANING CARTRIDGES.
APPLICATION FILED JAN. 9, 1899.
NO MODEL. 3 SHEETS—SHEET 1.
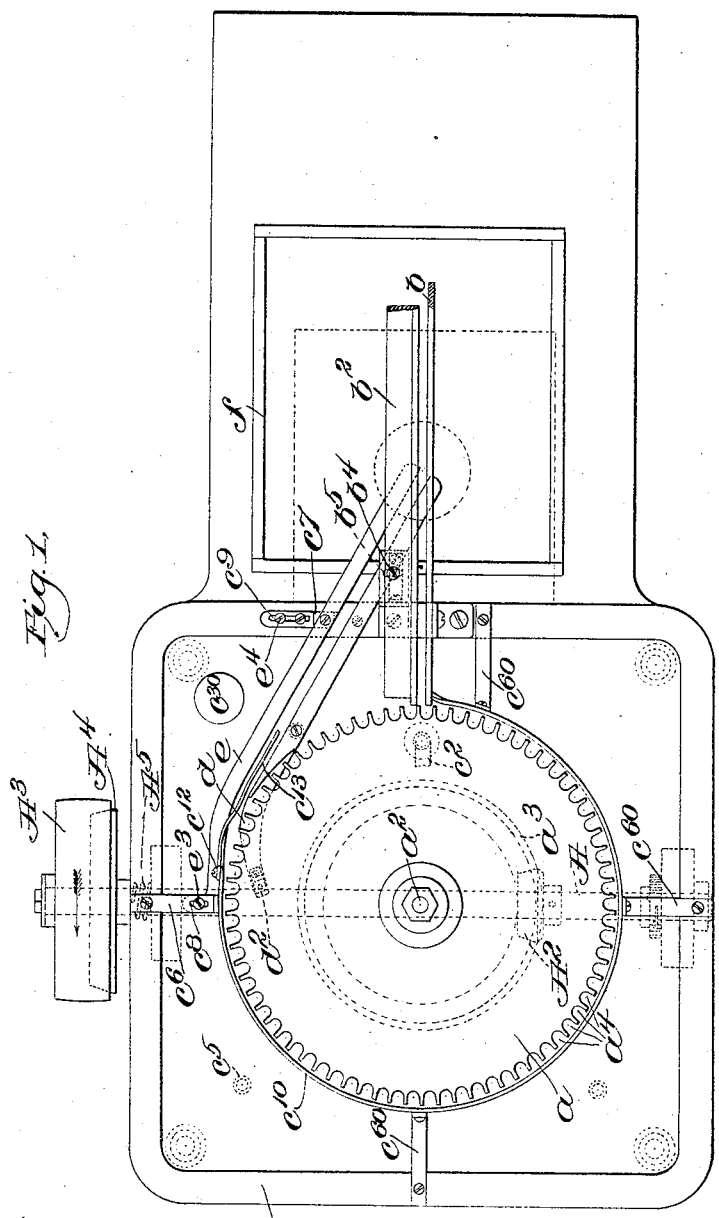

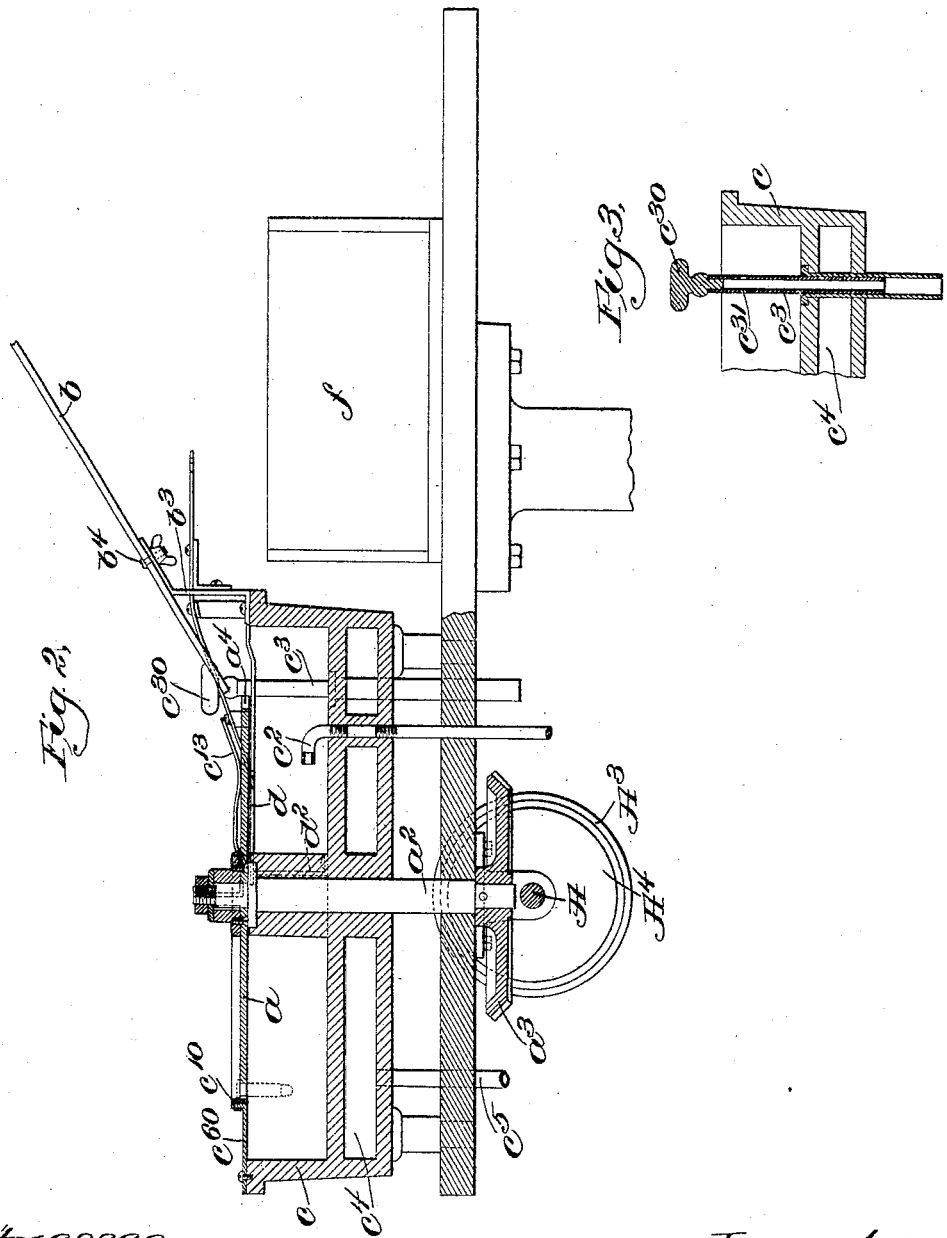

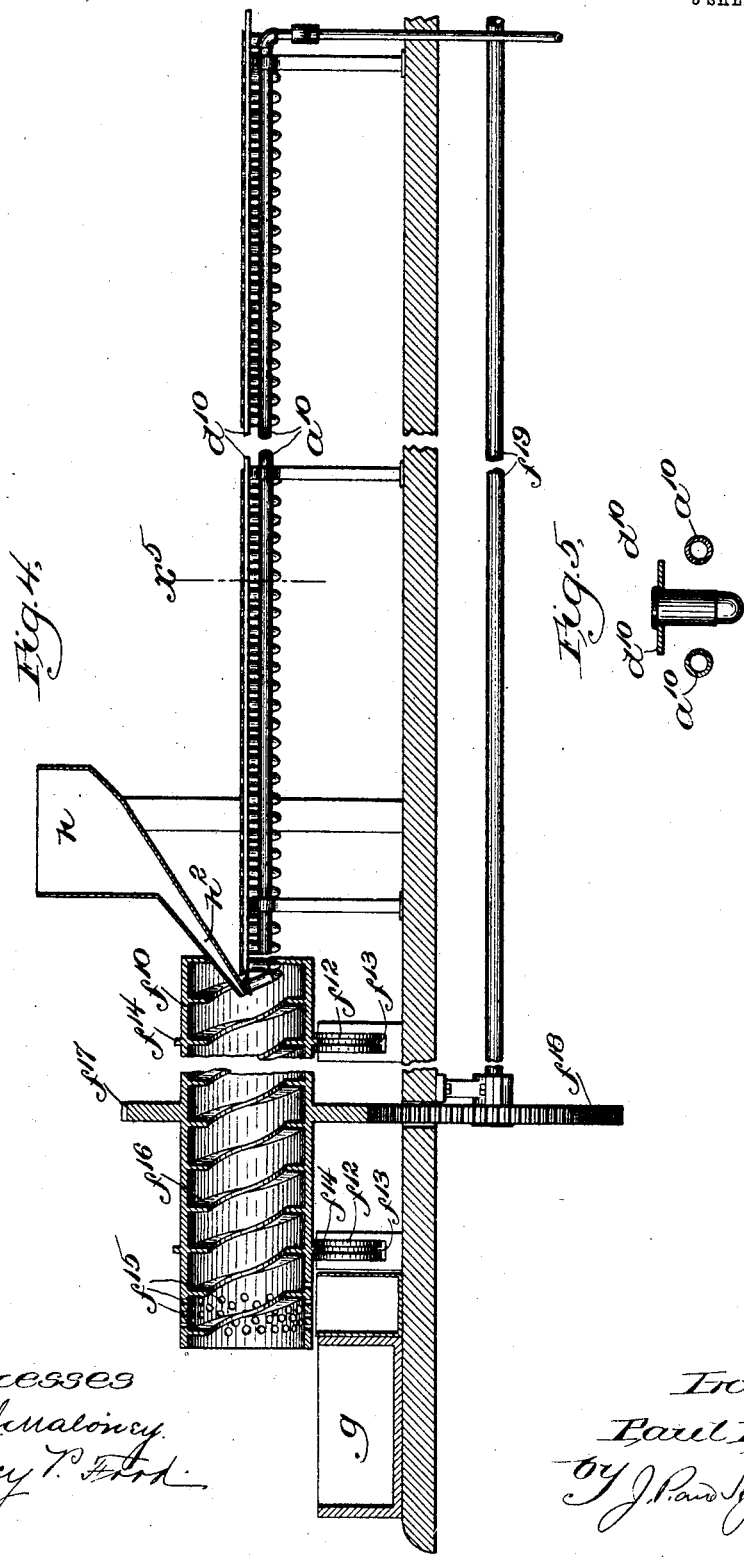

No. 774,826. Patented November 15, 1904.

UNITED STATES PATENT OFFICE.

PAUL BUTLER, OF LOWELL, MASSACHUSETTS.

APPARATUS FOR CLEANING CARTRIDGES.

SPECIFICATION forming part of Letters Patent No. 774,826, dated November 15, 1904.

Application filed January 9, 1899. Serial No. 701,654. (No model.)

*To all whom it may concern:*

Be it known that I, PAUL BUTLER, of Lowell, in the county of Middlesex and State of Massachusetts, have invented an Improvement in Apparatus for Cleaning Cartridges, of which the following description, in connection with the accompanying drawings, is a specification, like letters on the drawings representing like parts.

The present invention relates to a machine or apparatus for cleansing cartridges after they are finished in order to free them of the grease and dirt which collects upon them during the process of manufacture. The cleansing is accomplished by first subjecting the cartridges to the action of hot water in order to soften the grease and afterward agitating the cartridges in a mass of granular material, such as sawdust, which absorbs the moisture and removes the grease.

The apparatus embodying the invention comprises a carrier or propelling device adapted to receive cartridges fed thereto and to cause the same to travel through a bath of hot water or past a spraying device, so that they are subjected to the action of the water for a sufficient length of time, the apparatus being also provided with means for automatically delivering the cartridges into a mass of sawdust or other suitable cleansing and drying material. The cartridges may be delivered into a box or receptacle containing sawdust, which may be subsequently agitated and the cartridges then picked out by hand, or a device for automatically agitating the cartridges and sawdust may be employed, the means for accomplishing this latter purpose forming a feature of the present invention, while the apparatus may also be provided with means for separating the cartridges from the sawdust, so that they are delivered from the apparatus thoroughly dried and cleansed.

Figure 1 is a top plan view of an apparatus embodying the invention; Fig. 2, a vertical section of the same, partly in elevation; Fig. 3, a detail to be hereinafter referred to; Fig. 4, a longitudinal vertical section showing the essential portion of a modified form of apparatus, and Fig. 5 an enlarged transverse sectional detail on the line $X^5$ of Fig. 4.

The apparatus embodying the invention comprises a propelling device $a$, herein shown as a disk mounted on a vertical shaft $a^2$, provided at its lower end with a beveled gear $a^3$, coöperating with a beveled gear $A^2$ upon a suitable driving-shaft A. The said driving-shaft A is shown as provided with a pulley $A^3$, coöperating with a friction-disk $A^4$, which is pressed into engagement with the pulley by means of a spring $A^5$, so that if the propelling device $a$ is accidentally stopped by the catching of a cartridge when being fed to or delivered from the same the pulley $A^3$ can continue to rotate without damage to any of the parts of the machine. As herein shown, the propelling device $a$ is provided along its margin with a series of recesses $a^4$, each of which is adapted to receive a cartridge from a feed-chute $b$, shown as comprising two members separated by a space substantially equal in width to the body of the cartridge, the said feed-chute being inclined toward the periphery of the device $a$, so that cartridges resting on their flanges in the chute $b$ will be delivered one by one to the recesses $a^4$ as the margin of the propelling device travels past the end of the chute $b$.

In the form of apparatus shown in Figs. 1 and 2 the propelling device $a$ also constitutes the carrier for the cartridges while they are being subjected to the action of the hot water or washing fluid, and the said carrier is mounted over a tank $c$, shown as provided with an inlet-pipe $c^2$ and an overflow-pipe $c^3$, Figs. 2 and 3, so that water can be circulated through the same, the tank being also shown as provided with a steam-chamber $c^4$, having a steam-inlet $c^5$ for the purpose of heating the water in the tank. The overflow-pipe $c^3$ is shown as vertically movable and provided with an actuating-handle $c^{30}$, so that the overflow-opening $c^{31}$ can be moved toward or from the bottom of the tank to vary the water-level, if necessary, for cartridges of different lengths.

As the cartridges are fed to the propelling device or carrier $a$ each of the recesses $a^4$ receives a cartridge in the position shown in dotted lines, Fig. 2, the said cartridge resting on its flange upon the said carrier along the edge of a recess, while the body of the cartridge projects downward into the water in the tank. As long, therefore, as the cartridge remains supported in the carrier $a$ it is carried through the washing fluid and subjected to the action thereof. To deliver the cartridges after they have thus been subjected to the action of the washing fluid, the carrier $a$ is provided with a clearing device $d$, shown as consisting of a plate underlying the carrier and supported upon an upright $d^2$, (shown in dotted lines,) properly secured to the bottom of the tank. The edge of the said plate is curved so as to engage the bodies of the cartridges which project downward from the carrier and to thereby slide them radially out from the recesses, the flange then being engaged by the said plate $d$ and a plate $e$, the said plates $d$ and $e$ being separated by a space substantially equal in width to the diameter of the cartridge. The said plates $d$ and $e$ are inclined upward, as best shown in Fig. 2, and project beyond the edge of the tank, so that as the cartridges are pushed upward along the same they will drop upon leaving the said plates into a receptacle $f$, which is adapted to contain sawdust or other suitable cleansing and drying material.

As herein shown, the plate $e$ is supported near one end upon a projection or bracket $c^6$, secured to the wall of the tank $c$, and near the other end upon an upright $c^7$, also secured to another part of the wall of the tank, and the said plate $e$ is laterally adjustable, as shown in Fig. 1, by means of screws $e^3$ and $e^4$, extending, respectively, through slots $c^8$ and $c^9$, formed, respectively, in the bracket $c^6$ and in the upright $c^7$. The space between the plates $d$ and $e$ can thus be adjusted, if necessary, so as to support cartridges of different sizes, while the disk or carrier $a$ is readily detachable from the shaft $a^2$, so that another can be substituted having recesses of a different size. In the same way the chute $b$ can be adjusted by a lateral movement of the member $b^2$ thereof, which is shown as supported on a bracket $b^3$, projecting upward from the wall of the tank, the said member being secured to said bracket by means of a thumb-screw $b^4$, projecting through a slot $b^5$.

To prevent the cartridges from dropping out of the recesses in the travel of the propelling device, a guard $c^{10}$ is shown as extending along the periphery of said propelling device, said guard being supported at intervals by the bracket $c^6$ and other brackets $c^{60}$ corresponding thereto, as shown in Fig. 1, the construction and arrangement of one of said brackets being also shown in Fig. 2. Connected with said guard $c^{10}$, as by a screw $c^{12}$, there is also a supplemental guard $c^{13}$ projecting over the supports $d$ and $e$, so as to hold the cartridges in position as they are ejected from the propelling device and prevent them from being forced upward and thereby disengaged from the supports, as might otherwise happen.

In the form of apparatus thus far described the cartridges are slowly carried through the washing fluid and automatically delivered into the sawdust-receptacle, it being necessary, therefore, after a number of cartridges have been thus delivered to shake them in the sawdust-receptacle by hand in order to dry them and afterward to sort them out by hand. It is practicable, however, to render the operation completely automatic, and an apparatus designed for this purpose is shown in Fig. 4, there being also shown therein a modification of the means for subjecting the cartridges to the action of the water. As shown in Fig. 5, the cartridges are caused to travel along a support $d^{10}$ by any suitable or usual means, it being obvious that a propelling device or carrier similar to that which is shown in Figs. 1 and 2 may be employed for this purpose, the support $d^{10}$ being substantially the same in structure as the delivery-chute $d\,e$, hereinbefore described. The cartridges may be subjected to the action of the water in the tank before being delivered to the support $d^{10}$, if desired; but, as shown in Fig. 4, the said tank may be dispensed with entirely and the cartridges subjected to the action of running water supplied from pipes $a^{10}$, arranged, as shown in Figs. 4 and 5, parallel to the support $d^{10}$ and below the same, so that jets of water can be thrown against the cartridges through openings in the pipes $a^{10}$.

To subject the cartridges to the drying material, they may be delivered from the support $d^{10}$ after the grease is thoroughly softened by the action of the water into a sawdust-receptacle $f^{10}$, provided with propelling devices whereby both the cartridges and the sawdust are forced along and rolled or tumbled until the cartridges are thoroughly dried. As herein shown, the said receptacle $f^{10}$ comprises a rotatable cylinder supported on rolls $f^{12}$, having grooves $f^{13}$ to receive ribs $f^{14}$ upon the ends of the cylinder in order to hold the same in place upon the said rolls. The said cylinder is shown as provided with a spiral rib $f^{16}$, extending along its inner wall, so that in the rotation thereof the cartridges which gravitate toward the bottom of the cylinder will be carried along from one end to the other and finally ejected into a receptacle $g$. The said sawdust-receptacle is also intended to be continuously supplied with fresh sawdust, as from a hopper $h$, having a spout $h^2$ projecting into the receptacle $f^{10}$, so that both cartridges and sawdust are continuously fed into said receptacle. The apparatus is further provided with means for removing the sawdust from the cartridges before the latter are ejected from the receptacle $f^{10}$, and, as herein shown, the said receptacle is provided with a series of perforations $f^{15}$ near the delivery end thereof, so that when the sawdust reaches this point it will sift out through the said openings, leaving the cartridges clean. The rotation of the cylinder $f^{10}$ may be provided for in any suitable way, the said cylinder being herein shown as provided with a spur-gear $f^{17}$, meshing with the spur-gear $f^{18}$ on a counter-shaft $f^{19}$, which may be driven by a bevel-gear upon the shaft A, which drives the propelling device $a$, the connection not being herein shown, since the construction may be readily understood by reference to the several figures.

From the foregoing description it will be seen that the cartridges fed to the machine will be automatically carried forward and subjected to the action of the washing fluid and then ejected into a mass of dry material, in conjunction with which they are dried or cleansed.

It is obvious that the specific construction and arrangement of the various instrumentalities which coöperate in performing the operation may be widely varied without departing from the invention and that when the automatic agitating devices are employed for subjecting the cartridges to the action of the cleansing material or sawdust it is immaterial, so far as relates to the invention, whether the said cartridges are subjected to the action of the cleansing fluid through the agency of the tank through which the cartridges are carried or through the agency of the spraying devices which are adapted to act upon the cartridges as they are propelled along the support $d^{10}$. It is therefore not intended to limit the invention to the specific construction or arrangement herein shown or described, it being obvious, moreover, that the means for feeding and propelling the cartridges might be varied without departing from the invention.

I claim—

1. An organized machine for cleaning loaded cartridges comprising, in combination, a carrier adapted to convey said cartridges supported by their flanged ends with the bullet ends below said support; means for subjecting that portion only of the cartridges which extends below the support to the action of the cleansing fluid; and means for removing the cleaned cartridges from said support after their movement subjected to the action of the cleansing fluid, substantially as and for the purpose described.

2. In an organized machine for cleaning cartridges, the combination with a support for said cartridges adapted to engage the same by the flanged ends with the bullet ends projecting below said support; means for subjecting the bullet ends to the action of the cleansing fluid; and means for delivering said cartridges after subjection to the cleansing fluid to a receptacle containing drying material, such as sawdust, substantially as and for the purpose described.

In testimony whereof I have signed my name to this specification in the presence of two subscribing witnesses.

PAUL BUTLER.

Witnesses:
 HENRY J. LIVERMORE,
 LAURA M. CHITTENDEN.